(12) United States Patent
Negishi

(10) Patent No.: US 8,427,665 B2
(45) Date of Patent: Apr. 23, 2013

(54) PRINTING CONTROL APPARATUS, METHOD FOR CONTROLLING IMAGE FORMING APPARATUS, AND STORAGE MEDIUM

(75) Inventor: Akira Negishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 480 days.

(21) Appl. No.: 12/829,166

(22) Filed: Jul. 1, 2010

(65) Prior Publication Data
US 2011/0007339 A1 Jan. 13, 2011

(30) Foreign Application Priority Data

Jul. 8, 2009 (JP) .................................. 2009-161965

(51) Int. Cl.
G06K 15/00 (2006.01)
G06F 3/12 (2006.01)
G06F 1/00 (2006.01)
G03G 15/00 (2006.01)

(52) U.S. Cl.
USPC ......... 358/1.14; 358/1.15; 713/300; 713/330; 399/8

(58) Field of Classification Search ........................ None
See application file for complete search history.

(56) References Cited

U.S. PATENT DOCUMENTS

| | | | | |
|---|---|---|---|---|
| 6,509,975 | B1* | 1/2003 | Motegi | 358/1.14 |
| 6,587,953 | B1* | 7/2003 | Torikai | 713/330 |
| 7,383,448 | B2* | 6/2008 | Kohara | 713/300 |
| 7,474,431 | B2* | 1/2009 | Yamano et al. | 358/1.15 |
| 2011/0058822 | A1* | 3/2011 | Shioyasu et al. | 399/8 |

FOREIGN PATENT DOCUMENTS

JP 2008-099096 A 4/2008

* cited by examiner

Primary Examiner — Satwant Singh
(74) Attorney, Agent, or Firm — Canon USA Inc. IP Division

(57) ABSTRACT

A printing control apparatus includes a connection unit configured to be connectable to a plurality of networks, a storage unit configured to store a power supply control status corresponding to each of the plurality of networks and indicating either an on or off state, a change unit configured to change the power supply control status for each network, and a control unit configured to control a power supply of an image forming apparatus based on the power supply control status of the plurality of networks.

12 Claims, 20 Drawing Sheets

FIG. 6

```
Duplex = OFF      ⎫
Size   = A4       ⎬ 601
   ⋮              ⎪
Orientation = Portrait ⎭

Network     = A   ⎬ 602
```

FIG. 7

| ID | FILE NAME | SIZE | Network |
|---|---|---|---|
| 1 | Test | 1243567 | A |
| 2 | temp | 200543455 | B |

FIG. 14

USER MANAGEMENT INFORMATION

| User ID | Name | Network |
|---|---|---|
| 1 | YAMADA TAROU | A |
| 2 | KIMURA HANAKO | B |
| 3 | YAMAMOTO ICHIROU | A |
| ⋮ | | |

FIG. 18

POWER SUPPLY CONTROL STATUS TABLE

|  | POWER SUPPLY CONTROL STATUS | AUTOMATIC SHUTDOWN TIMER |
|---|---|---|
| Network-A | OFF | 10 |
| Network-B | ON | 50 |

PRINTING CONTROL APPARATUS, METHOD FOR CONTROLLING IMAGE FORMING APPARATUS, AND STORAGE MEDIUM

BACKGROUND OF THE INVENTION

1. Field of the Invention

The present invention generally relates to printing apparatuses and, more particularly, to a power source control mechanism in an image forming apparatus connectable to a plurality of networks.

2. Description of the Related Art

Until now, there has been widely used a printing system which is connected to a network to be shared by a large number of users on the network. On the other hand, a printing system has been known which has a plurality of network ports and can be used across a plurality of networks. Such a connection to the plurality of networks is referred to as multi-home connection. One of purposes of the multi-home connection is to share one printing system with a plurality of networks, such as a network for employees of a company and a network for visitors. Japanese Patent Application Laid-Open No. 2008-099096 discuses such a printing system connectable to a plurality of networks.

Most users use a printing system without being aware of or confirming situations where the printing system is used in another network, so that it is difficult for the users to determine when to turn off the power supply of the printing system when they go home from the office at night, for example. Although it is possible to entrust the turning off of the power supply to an automatic power supply cutoff mechanism such as an existing automatic shutdown mechanism, a more efficient power supply control technique may be demanded in terms of ecology and operability.

Although Japanese Patent Application Laid-Open No. 2008-099096 discusses a technique for acting as a proxy to perform communication processing for the purpose of making more efficient an energy-saving mode control operation of a network interface connected to one network, it does not deal with a technique for controlling a power supply of the printing system connected to a plurality of networks.

SUMMARY OF THE INVENTION

According to an aspect of the present invention, a printing control apparatus includes a connection unit configured to be connectable to a plurality of networks, a storage unit configured to store a power supply control status corresponding to each of the plurality of networks and indicating either an on or off state, a change unit configured to change the power supply control status for each network, and a control unit configured to control a power supply of an image forming apparatus based on the power supply control status of the plurality of networks.

According to an exemplary embodiment of the present invention, a shutdown operation of a multi-home printing system connectable to a plurality of networks can be performed without users confirming situations where the multi-home printing system is used in other networks. The power supply of the printing system can be turned off at an optimal timing, thus allowing contribution to $CO_2$ reduction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of an attribute value to be transmitted from the printing control apparatus in FIG. 2 to the image forming apparatus in FIG. 3.

FIG. 7 illustrates an example of a table including contents of a database which the image forming apparatus in FIG. 3 stores in a hard disk drive (HDD).

FIG. 14 illustrates an example of user management information according to an exemplary embodiment of the present invention.

FIG. 18 illustrates an example of a power supply control status table of the printing control apparatus.

DESCRIPTION OF THE EMBODIMENTS

Various exemplary embodiments, features, and aspects of the invention will be described in detail below with reference to the drawings.

Figure 1:
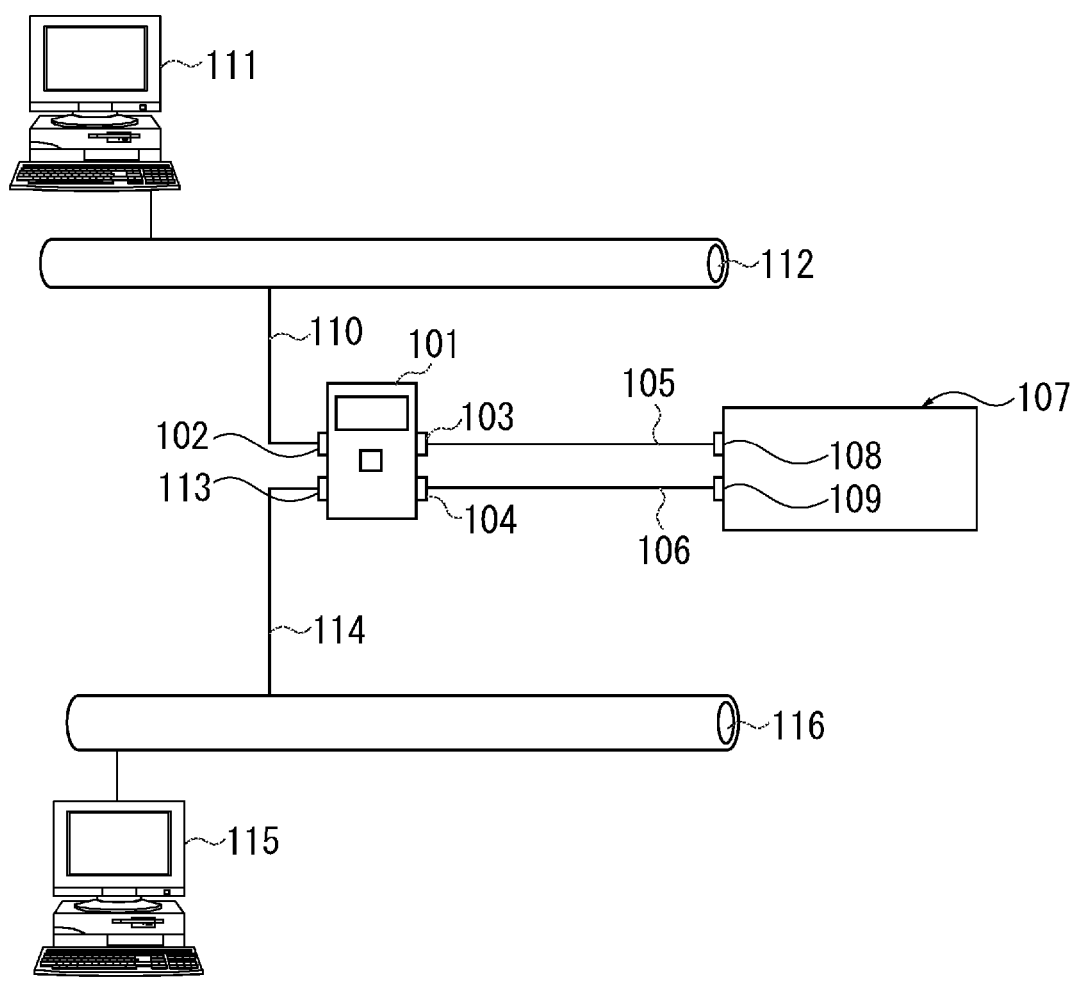
FIG. 1 is a schematic diagram illustrating a connection of an image forming system according to an exemplary embodiment of the present invention.

FIG. 1 is a schematic diagram illustrating a connection of an image forming system according to an exemplary embodiment of the present invention. In the image forming system according to the present exemplary embodiment, in particular, a printing control apparatus 101 has a plurality of network interface cards (NICs) 102, 103, and 113 and is connectable to both networks 112 and 116 through the NICs 102 and 113. Data transferred to and from a host computer 111 on the network 112 is input to the printing control apparatus 101 from the NIC 102 through a signal line 110. Data transferred to and from a host computer 115 on the network 116 is input to the printing control apparatus 101 from the NIC 113 through a signal line 114. The printing control apparatus 101 is connected to an image forming apparatus 107 through a signal line 105 connected between the NIC 103 of the printing control apparatus 101 and the NIC 108 of the image forming apparatus 107. A dedicated transmission path interface board 104 of the printing control apparatus 101 is connected to a dedicated transmission path interface board 109 of the image forming apparatus 107 through a dedicated transmission line 106. The printing control apparatus 101 may be incorporated in the image forming apparatus 107.

Figure 2:
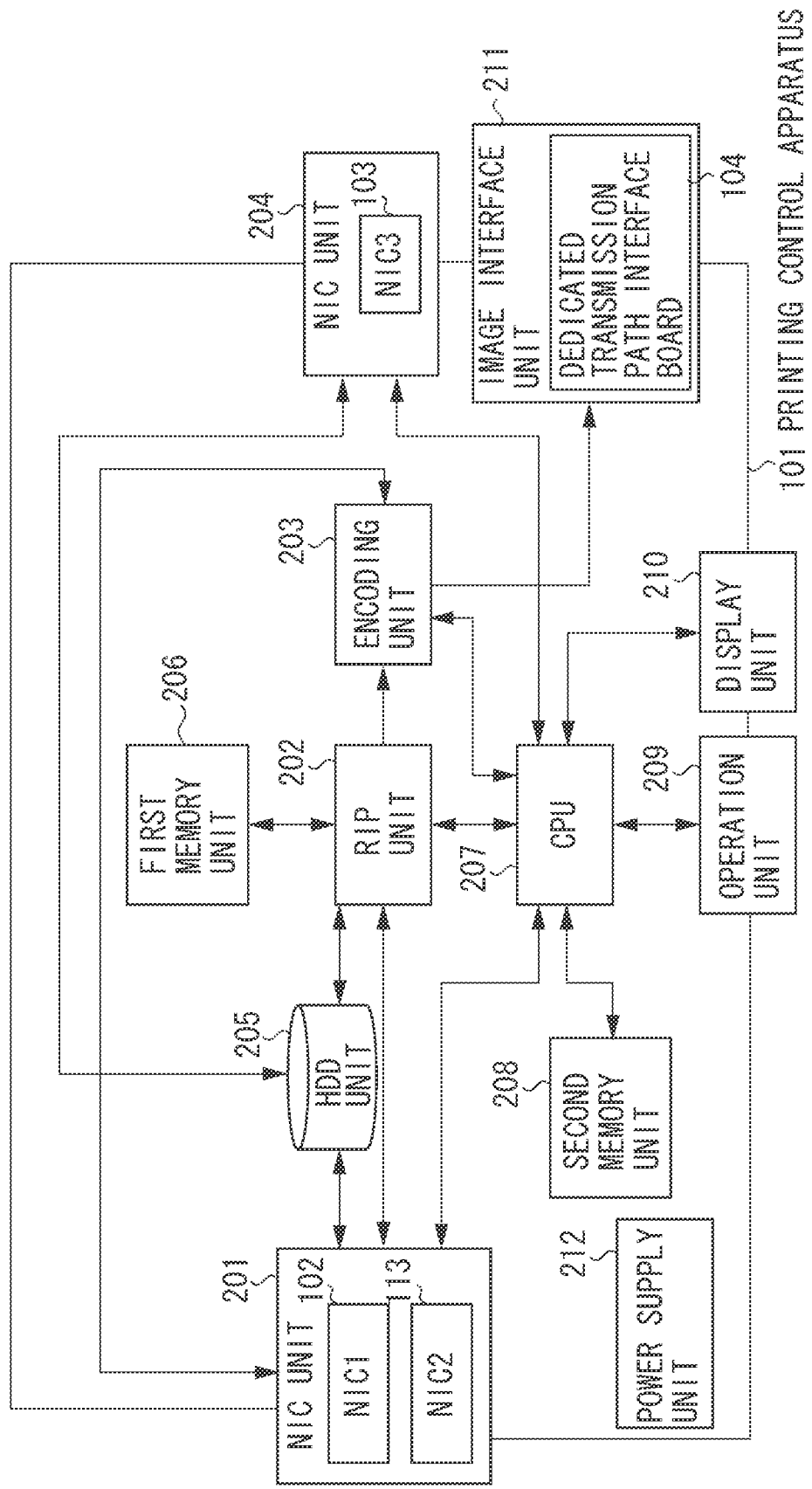
FIG. 2 is a block diagram illustrating a configuration of a printing control apparatus in FIG. 1.

FIG. 2 is a block diagram illustrating a configuration of the printing control apparatus 101 in FIG. 1. The printing control apparatus 101 includes an NIC unit 201 and the NIC unit 201 includes the NICs 102 and 113. In the description of the present exemplary embodiment, the interface connected to the network is limited to an NIC. However, other interfaces connectable to the network may be used. Although two network interfaces are limitedly used in the present exemplary embodiment, three or more interfaces may be used in the present exemplary embodiment. The NIC unit 201 functions as a first network interface for controlling the connection of a local area network (LAN) with a lower layer level. The output side of the NIC 201 is connected to a raster image processor (RIP) unit 202 and a hard disk drive (HDD) unit 205.

The RIP unit 202 has a function to convert print language such as a received PDL (Page Description Language) or a specific (compressed by JBIG (Joint Bi-Level Image Experts Group)) data format into a raster image. The HDD unit 205 is a storage unit for temporarily storing (spools) print data received by the NIC unit 201 or temporarily storing compressed data after the RIP unit 202. A first memory unit 206 is a memory used as image rasterization processing by the RIP unit 202. Data converted into a raster image by the RIP unit 202 is input to an encoding unit 203. The encoding unit 203 converts the data into print data or data format supported by the image forming apparatus 107. The printing control apparatus 101 includes an NIC unit 204 and an image interface unit 211. The NIC unit 204 functions as a second network interface for controlling the connection of a lower layer level. Data output from the encoding unit 203 is output to the image forming apparatus 107 through an image interface unit 211.

The printing control apparatus 101 further includes a central processing unit (CPU) 207, a second memory unit 208, an operation unit 209, and a display unit 210. The CPU 207 controls the entire printing control apparatus 101 and uses the second memory unit 208 as a temporary data storage area. The operation unit 209 includes a button and a key and performs the operation of the printing control apparatus 101. The display unit 210 displays an image and characters on its screen to notify a user of information. The display unit 210 includes an operation panel integrally formed of the operation unit 209 and is a touch panel, for example. The printing control apparatus 101 transfers data to the dedicated transmission line 106 through the image interface unit 211 to transmit the data to the image forming apparatus 107.

A data packet is transmitted from the terminal apparatus 111 (or 115) to the printing control apparatus 101 through the network 112 (or 116) and the NIC 102 (or 113). The NIC unit 201 in the printing control apparatus 101 receives the data packet. If the data packet received by the NIC unit 201 conforms to TCP/IP (Transmission Control Protocol/Internet Protocol), a destination port number is included in the header information portion of the packet. The destination port number is information indicating that data should be sent to which program/process in the apparatus receiving the packet. The port numbers are different and are allocated according to communication protocols or programs. For example, the port numbers can be allocated as follows, where FTP (File Transfer Protocol)=Port21, SMTP (Simple Mail Transfer Protocol) =Port25, and SNMP (Simple Network Management Protocol)=Port161.

For this reason, a port number included in the header of the received data packet is surveyed and it is determined whether the port number corresponds to print processing, thereby allowing determining whether the packet is print data or other data such as control data. If it is determined that the packet is print data, the received data is written in the HDD unit 205 by the control of the CPU 207 if required. This is queuing (spool) which is generally performed to improve the transfer rate of data. The data stored in the HDD unit 205 is read from the RIP unit 202 in accordance with the instructions of the CPU 207. On the other hand, the print data which is not queued is directly transferred from the NIC unit 201 to the RIP unit 202 in accordance with the instructions of the CPU 207. Thus, the print data sent to the RIP unit 202 is subjected to a raster imaging process in the RIP unit 202.

Subsequently, the encoding unit 203 performs encoding to a data format which can be interpreted by the image forming apparatus 107 based on a predetermined data format which can be interpreted by the image forming apparatus 107 and the received data format. The above predetermined data format may be replaced with the data format acquired from the image forming apparatus 107 through communication or the data format specified by the operation unit 209, for example. The encoding process is performed according to need, so that, if the encoding is not needed (for example, if the format of the received print data can be directly interpreted by the image forming apparatus 107), the encoding process may be omitted.

The encoded data needs to be provided in an interpretable format for the image forming apparatus 107. For example, the format is changed with the capacity of an interpretation unit incorporated in the image forming apparatus 107, such as a specific print language format or a data format compressed by a specific method, such as JBIG, and a document format. Thus, the data encoded according to need is packeted again by the NIC unit 204 to be transmitted to the signal line 105 and then transmitted from the signal line 105 to the image forming apparatus 107. The image forming apparatus 107 receiving the data packet prints the packet on a recording medium such as paper according to a print processing procedure thereof. A method of transmitting data differently from the above can be used such that data is transmitted from the encoding unit 203 to the image interface unit 211 and the dedicated transmission line 106 through the dedicated transmission path interface board 104. The data is finally delivered to the image forming apparatus 107 through the dedicated transmission path interface board 109 connected to the image forming apparatus 107. The printing control apparatus 101 further includes a power supply unit 212 which can be controlled by the CPU 207. The power supply unit 212 is also used as a power supply of the image forming apparatus 107.

Figure 3:
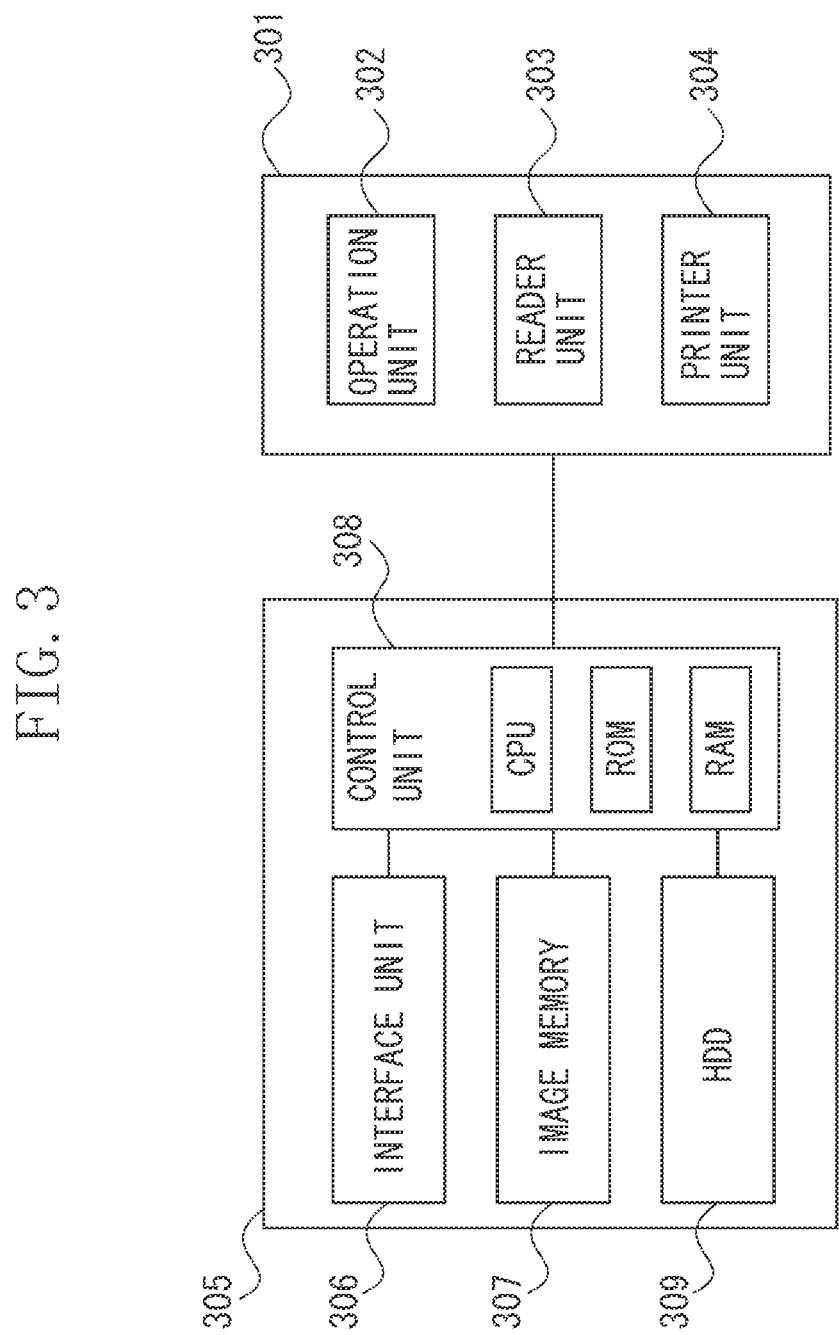
FIG. 3 is a block diagram illustrating a configuration of an image forming apparatus in FIG. 1.

FIG. 3 is a block diagram illustrating a configuration of the image forming apparatus 107 in FIG. 1. As illustrated in FIG. 3, the image forming apparatus 107 of the present exemplary embodiment includes an image forming apparatus body 301 and an image input/output control unit 305. The image forming apparatus body 301 includes an operation unit 302, a reader unit 303, and a printer unit 304. The operation unit 302 is used to operate the image forming apparatus body 301 and the image input/output control unit 305 and a display panel for operation is integrally attached to the operation unit 302. The reader unit 303 reads an image on a document and outputs image data according to the image on the document to the printer unit 304 and the image input/output control unit 305. The printer unit 304 records the image on a sheet of recording paper according to the image data from the reader unit 303 or the image input/output control unit 305.

The image input/output control unit 305 is connected to the reader unit 303 and includes an interface unit 306, an image memory 307, a control unit 308, and a hard disk drive (HDD) 309. The interface unit 306 is connected to the NIC 108 and the dedicated transmission path interface board 109. The HDD 309 stores information set in the image forming apparatus 107, such as address book, operation history, user setting, identifier (ID) setting, and network setting, for example. The interface unit 306 interfaces with the printing control apparatus 101. The interface unit 306 causes the dedicated transmission path interface board 109 to receive code data representing the image transferred from the printing control apparatus 101 and delivers the received data to the control unit 308 with the received data developed to image data recordable at the printer unit 304. The interface unit 306 causes the network interface 108 such as Ethernet to receive code data representing the image transmitted from the printing control apparatus 101. The interface unit 306 develops the received data if needed to data recordable at the printer unit 304 and delivers it to the control unit 308.

The network interface 108 is one such as Ethernet and is connected to the printing control apparatus 101 through a network. The network interface 108 may be a parallel interface or a USB (Universal Serial Bus) interface directly connected to the printing control apparatus 101 through an interface cable. One or more cables may be used. The control unit 308 includes a CPU, a ROM (Read-Only Memory), and a RAM (Random-Access Memory). The CPU of the control unit 308 loads a program stored in the ROM or other storage media onto the RAM and executes it to control the flow of data among the reader unit 303, the interface unit 306, and the image memory 307. The HDD 309 may be replaced with other nonvolatile memories, in which data is not deleted even if a power supply is turned off, to store data in the nonvolatile memory. In the present exemplary embodiment, although a configuration is described in which the printing control apparatus 101 is connected to the image forming apparatus 107, the present invention is also applicable to a configuration only of the image forming apparatus 107.

Figure 4:
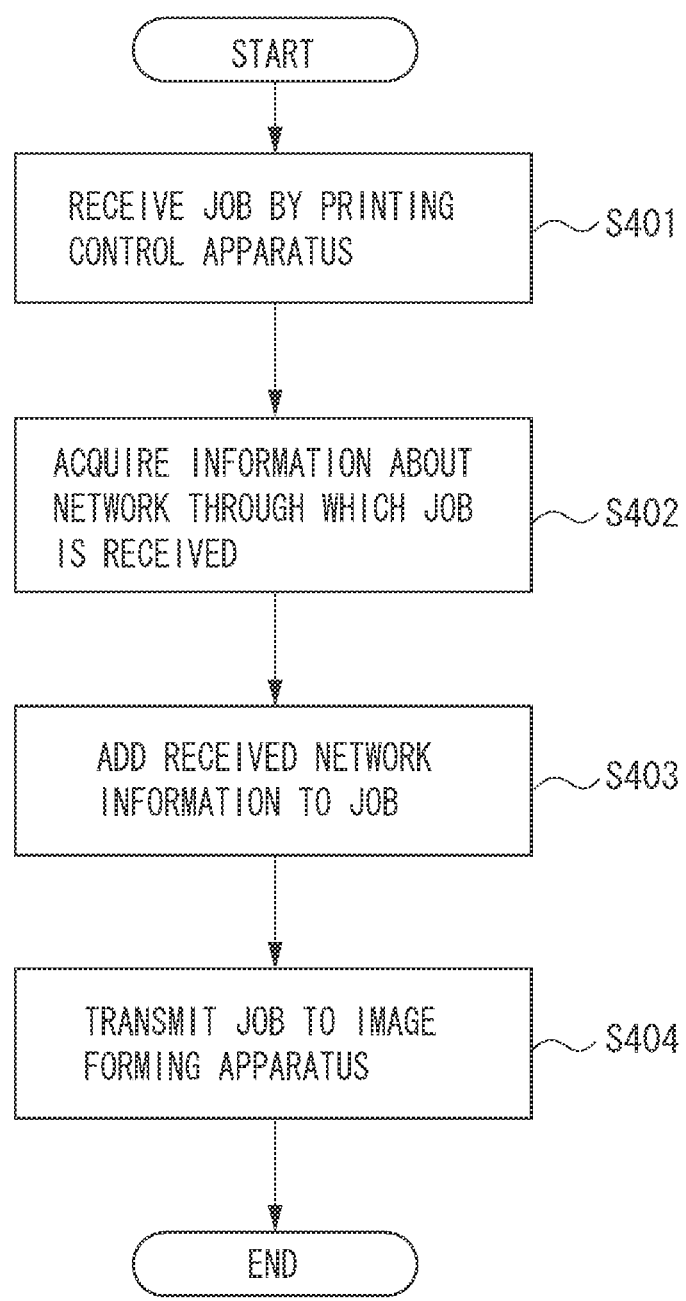
FIG. 4 is a flow chart executed when the printing control apparatus receives a job according to an exemplary embodiment of the present invention.
Figure 5:
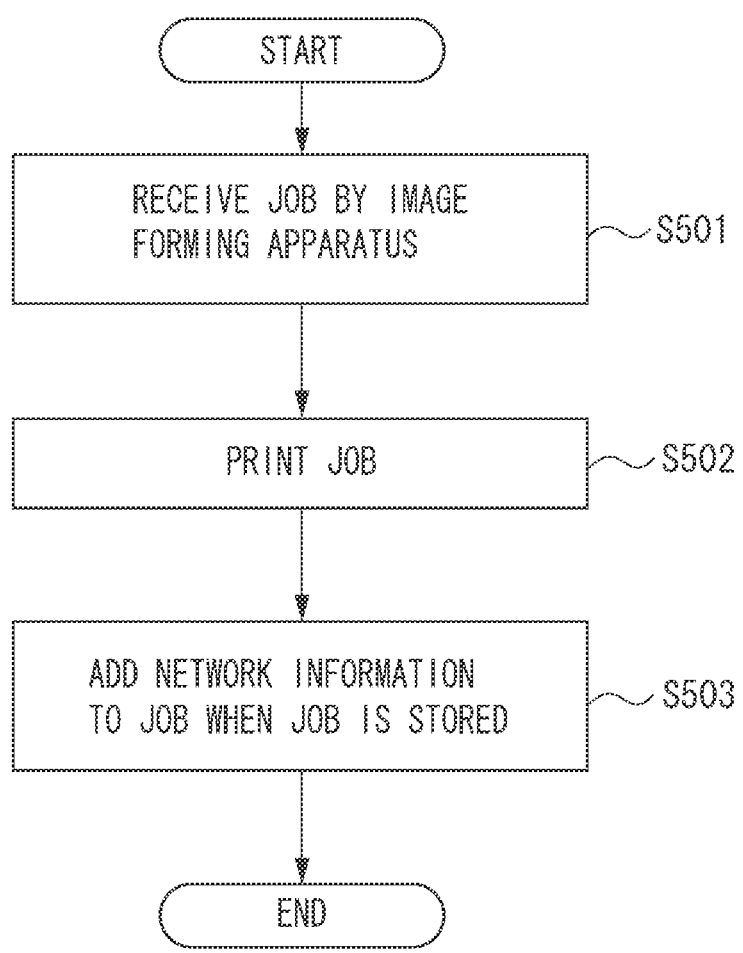
FIG. 5 is a flow chart executed when the image forming apparatus receives a job according to an exemplary embodiment of the present invention.

A flow in which the terminal apparatus 111 (or 115) generates a job and the job is stored in the HDD 309 of the image forming apparatus 107 is described below with reference to flow charts in FIGS. 4 and 5. FIG. 4 is a flow chart in the case where the printing control apparatus 101 receives a job. FIG. 5 is a flow chart in the case where the image forming apparatus 107 receives a job. The flow of the printing control apparatus 101 is described with reference to FIG. 4. When a user using the terminal apparatus 111 (or 115) generates a job and the job is stored in the image forming apparatus 107, the terminal apparatus 111 transmits the job to the printing control apparatus 101 by the operation of the user. When the job is transmitted, the processing proceeds to step S401. In step S401, the printing control apparatus 101 receives the job. In step S402, the printing control apparatus 101 confirms the network through which the job is received. The printing control apparatus 101 forms a socket for receiving the job and acquires network information from the socket. As another method of acquiring network information, there may be used a method of confirming whether data being currently received is transmitted through the networks 112 or 116 using a driver produced for monitoring all data received by the NIC. When the printing control apparatus 101 finishes acquiring the network information, the processing proceeds to step S403. In step S403, the printing control apparatus 101 adds the network information acquired in step S402 to the job.

FIG. 6 illustrates an attribute list in which the network information is added to the job. In the present exemplary embodiment, the network 112 is referred to as "network A" and the network 116 is referred to as "network B." A portion 601 in FIG. 6 indicates attribute information (paper size and surface designation) of the job transmitted from the printing control apparatus 101 and information for the printing control apparatus 101 transmitting the job to the image forming apparatus 107. A portion 602 is the network information acquired by the printing control apparatus 101 in step S402 added as an attribute value and transmitted to the image forming apparatus 107 with the portion 601. In step S403, the network information is added to the attribute of the job. Thereafter, in step S404, the printing control apparatus 101 transmits the generated job to the image forming apparatus 107. In the present exemplary embodiment, addition to the attribute of the job is described above. In executing the job, the printing control apparatus 101 performs processing on the job and then transmits the processed job to the image forming apparatus 107 (for example, RIP processing).

The flow of the image forming apparatus 107 is described below with reference to FIG. 5. In step S501, the image forming apparatus 107 receives a job from the printing control apparatus 101 and then the processing proceeds to step S502. In step S502, the image forming apparatus 107 performs a printing process of the job transmitted from the terminal apparatus 111 (or 115). When the image forming apparatus 107 finishes processing such as printing in step S502, the processing proceeds to step S503. In step S503, the image forming apparatus 107 acquires the network information 602 added by the printing control apparatus 101 from the job, adds the network information 602 to the attribute value of the job and stores the job in the HDD 309.

Figure 8:
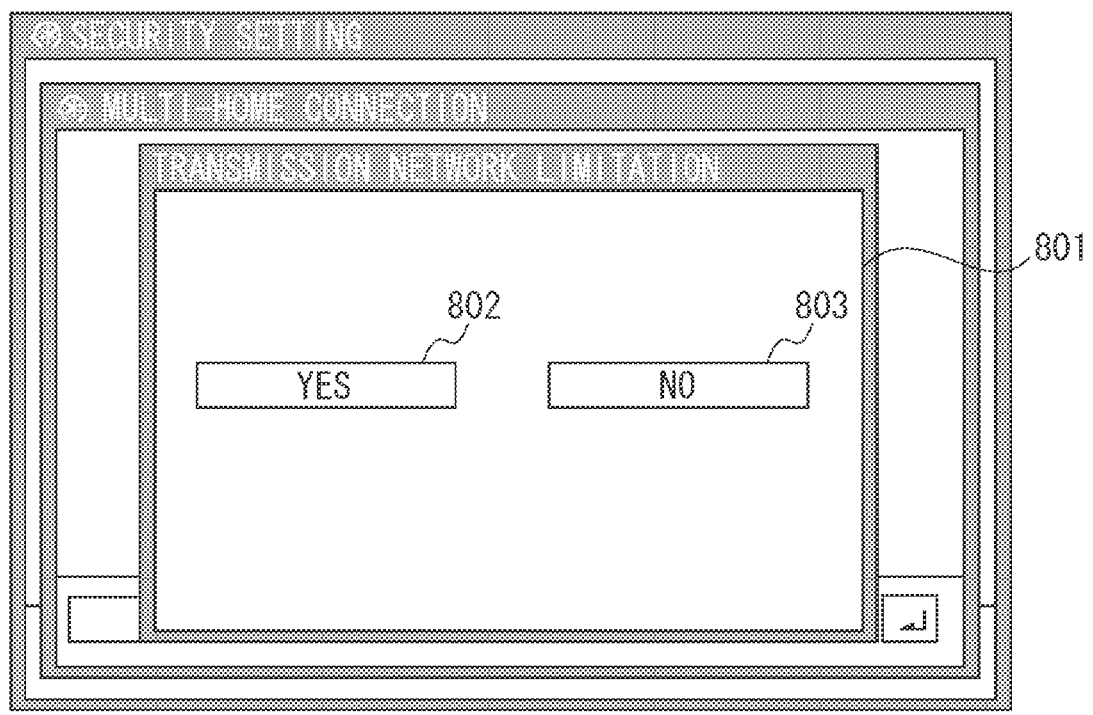
FIG. 8 illustrates an example of a transmission limitation screen displayed on an operation unit of the image forming apparatus in FIG. 3.

FIG. 7 is a database file in which the job is stored. The network information acquired from the job is stored in a network column in FIG. 7. After the image forming apparatus 107 adds the network information to the job in storing it, the image forming apparatus 107 finishes processing. The network information may be added to the job always or only when the user is set. If the network information is added to the job only when the user is set, a user interface is prepared for setting by the operation unit 209 of the printing control apparatus 101 or the operation unit 302 of the image forming apparatus 107. FIG. 8 illustrates an example of a screen of the user interface. A user interface screen 801 executes the setting of the function. A "Yes" button 802 and a "No" button 803 are arranged. The user pressing the Yes button 802 adds the network information to the job and the user pressing the No button 803 does not add the network information to the job. The setting information may be stored in both the printing control apparatus 101 and the image forming apparatus 107 or in either the printing control apparatus 101 or the image forming apparatus 107.

Figure 9:
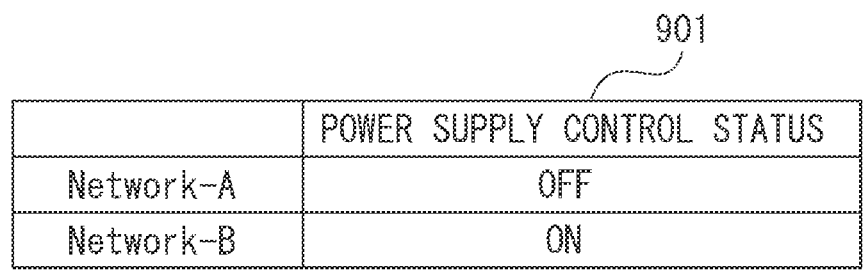
FIG. 9 illustrates a power supply control status table.

FIG. 9 illustrates a power supply control status table 901. The power supply control status table 901 is stored in the second memory unit 208 of the printing control apparatus 101. In FIG. 9, a Network-A corresponds to the NIC 102 and a Network-B corresponds to the NIC 113. Either a value "on" or "off" is stored in each network. The value "on" indicates that the network is used and shutdown is prohibited. The value "off" indicates that the network is not used and shutdown is allowed.

When the printing control apparatus 101 starts, the power supply control status of all the networks is turned on. The power supply control status of each network is turned off by the condition described below. When the power supply control status of all the networks is turned off, the CPU 207 performs a procedure for shutting down the system and controls the power supply unit 212 to turn off the power supply of the entire system. In the present exemplary embodiment, "off" of the power supply control status indicates a state where the corresponding network is not used. This represents an intermediate state where the power supply control status of all the networks is turned off, the entire system is shut down and the power supply is turned off. When the power supply control status is turned off, such control may be performed as to reduce consumption power by switching the operation mode of the corresponding NICs 102 or 113. Since the second memory unit 208 is formed of a volatile memory, the entire system is shut down and the power supply is turned off to clear the power supply control status table.

Figure 10:
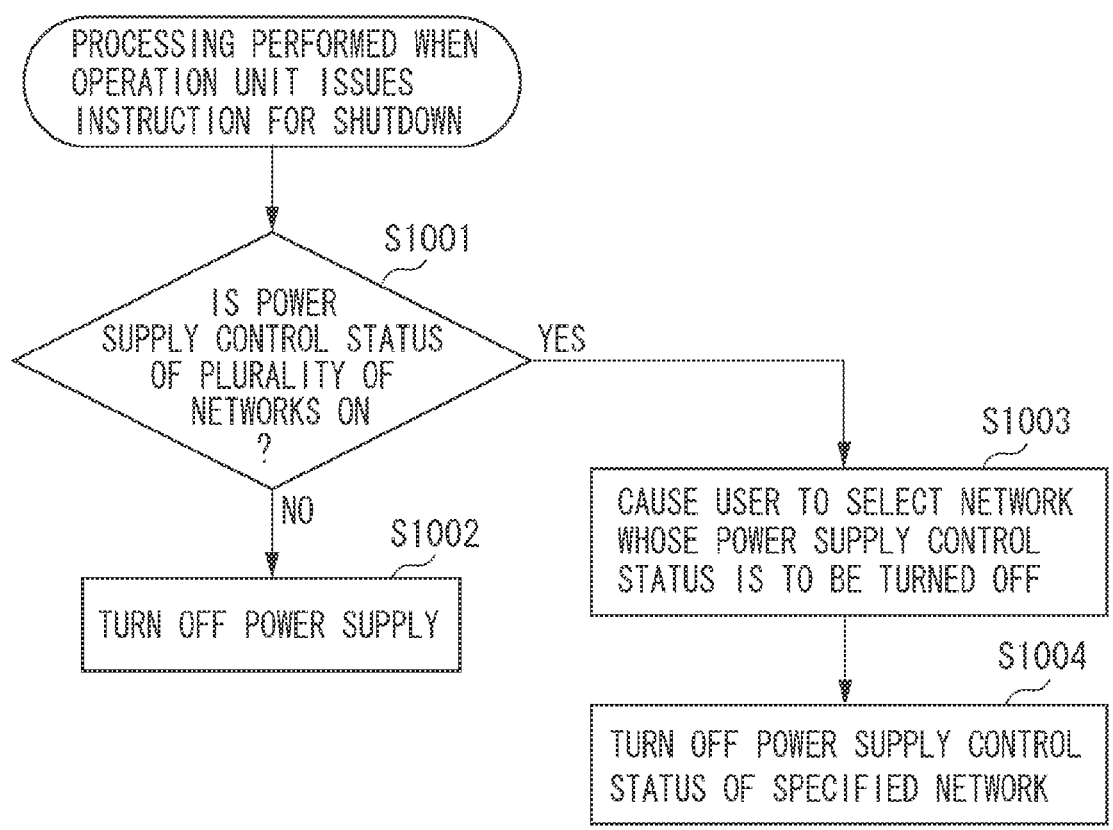
FIG. 10 is a flow chart illustrating a shutdown operation by the operation unit according to an exemplary embodiment of the present invention.
Figure 11:
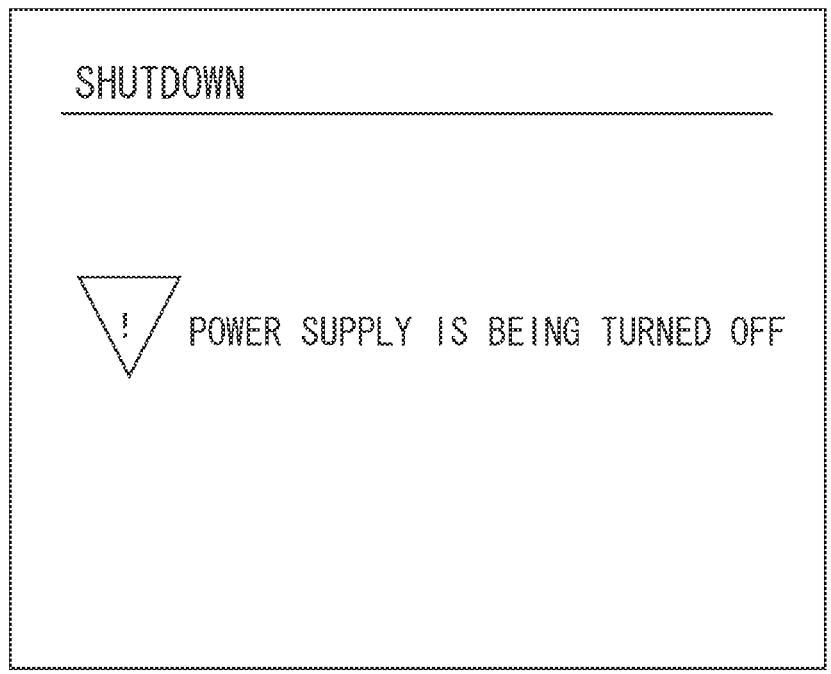
FIG. 11 illustrates an example of display of the operation unit during shutdown processing by the printing control apparatus.

FIG. 10 illustrates a flow performed by the CPU 207 when the operation unit 209 of the printing control apparatus 101 issues instructions for shutdown. After the operation unit 209 issues instructions for shutdown (not shown), in step S1001, the CPU 207 refers to the power supply control status table in the second memory unit 208 to determine whether the power supply control status of a plurality of networks is turned on. If the power supply control status of a plurality of networks is not turned on (NO in step S1001), in other words, if the power supply control status of a single network is turned on, then in step S1002, the power supply is turned off. In this case, the CPU 207 saves various data stored in the second memory unit to the HDD unit 205 in advance to perform a series of processing operations for turning off the power supply of the printing control apparatus 101 and the image forming apparatus 107, and, thereafter, the CPU 207 turns off the power supply of the power supply unit 212. The CPU 207 displays a shutdown screen illustrated in FIG. 11 on the display unit 210 while performing a series of processing operations for turning off the power supply.

Figure 12:
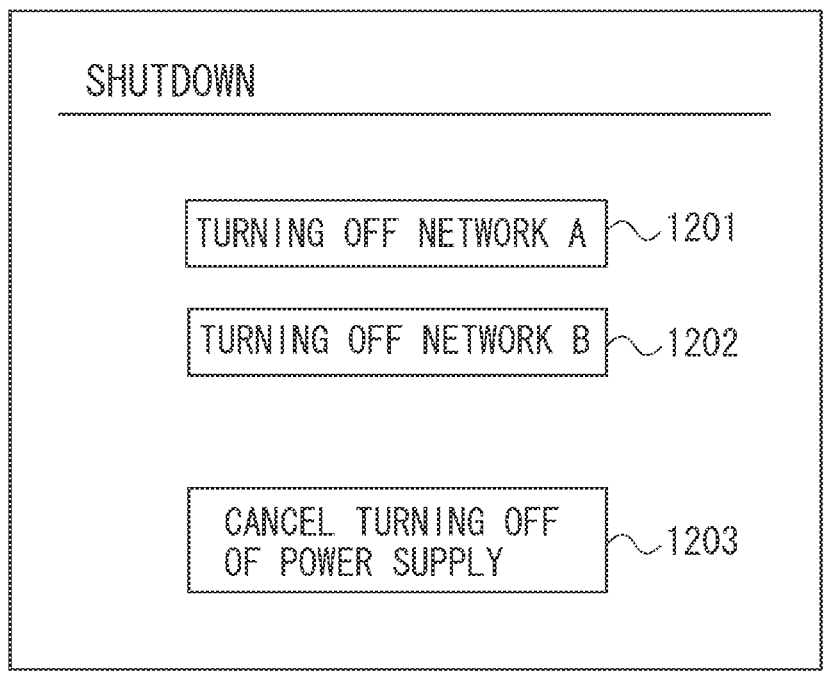
FIG. 12 is a chart illustrating an example of a network selection screen for instructions for shutdown issued by the printing control apparatus.

If the power supply control status of a plurality of networks is turned on (YES in step S1001), then in step S1003, the CPU 207 causes the user to select the network whose power supply control status is to be turned off. At this point, a screen illustrated in FIG. 12 is displayed on the display unit 210. Buttons 1201 or 1202 are used to turn off either the network A or the network B, respectively. When either of the buttons 1201 or 1202 is pressed, then in step 1004, the CPU 207 changes the power supply control status of the corresponding network to "Off." Pressing a button 1203 causes the CPU 207 to stop the shutdown processing. In the present exemplary embodiment, fixed names of "Network A" and "Network B" are used on the screen for causing the user to select the network whose power supply control status is to be turned off. For the sake of clear understanding, in this respect, any character string may be allocated to networks and displayed on the buttons 1201 and 1202.

Figure 13:
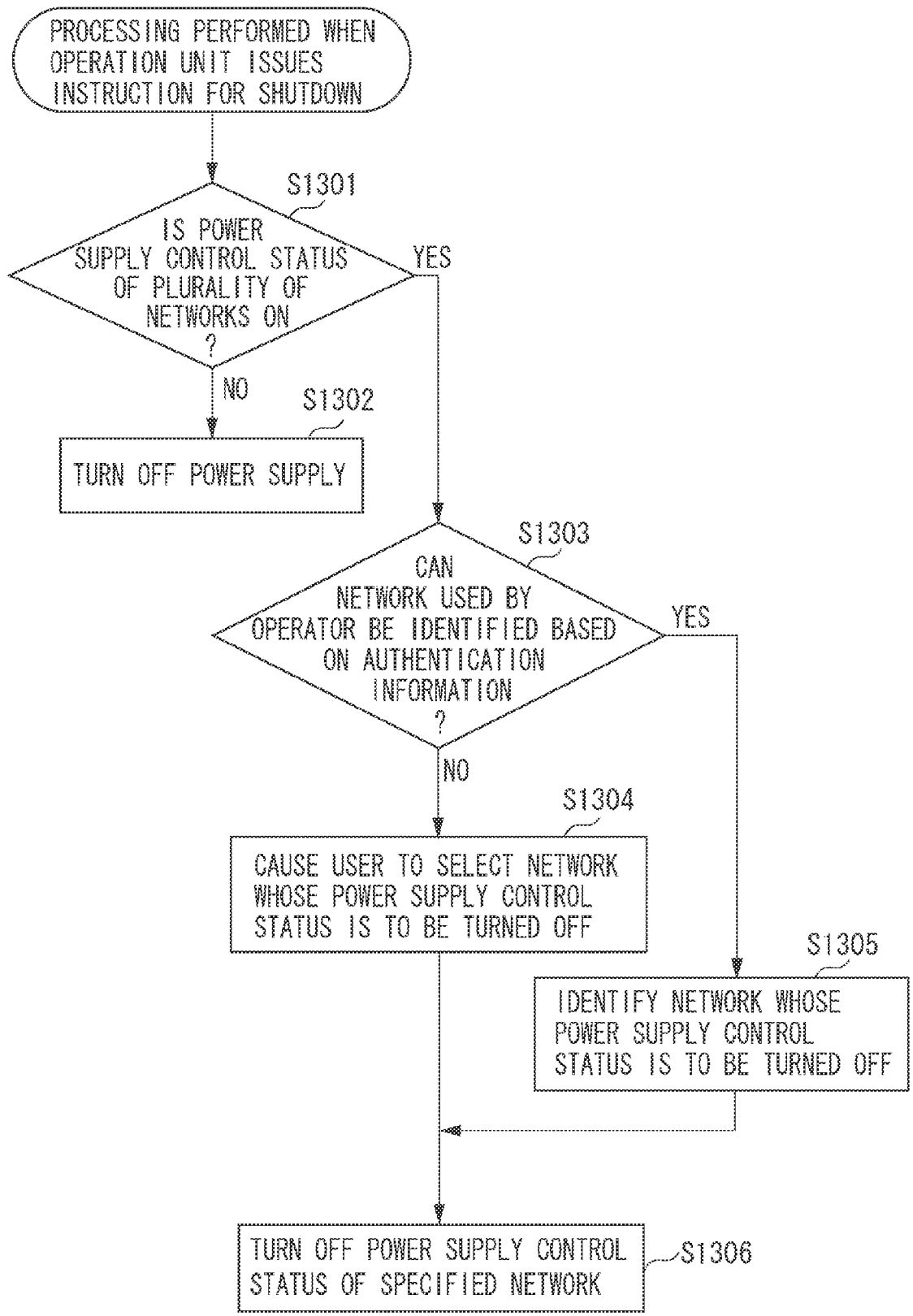
FIG. 13 is a flow chart illustrating a shutdown operation by the operation unit according to an exemplary embodiment of the present invention.

FIG. 13 illustrates another example of a flow of processing performed by the CPU 207 when the operation unit 209 of the printing control apparatus 101 issues instructions for shutdown to the CPU 207. In the present exemplary embodiment, it is premised that the operation unit 209 includes a card reader (not shown) and performs an authentication operation using the card before operating the printing control apparatus 101. After the operation unit 209 issues instructions for shutdown (not shown), in step S1301, the CPU 207 refers to the power supply control status table in the second memory unit 208 to determine whether the power supply control status of a plurality of networks is turned on. If the power supply control status of a plurality of networks is not turned on (NO in step S1301), in other words, if the power supply control status of a single network is turned on, then in step S1302, the power supply is turned off. In this case, the CPU 207 saves various data stored in the second memory unit to the HDD unit 205 in advance to perform a series of processing operations for turning off the power supply of the printing control apparatus 101 and the image forming apparatus 107, and, thereafter, the CPU 207 turns off the power supply of the power supply unit 212. The CPU 207 displays a shutdown screen illustrated in FIG. 11 on the display unit 210 while performing a series of processing operations for turning off the power supply.

If the power supply control status of a plurality of networks is turned on (YES in step S1301), then in step S1303, the CPU 207 determines whether a network used by an operator can be identified based on authentication information. In the present exemplary embodiment, user management information illustrated in FIG. 14 is stored in the second memory unit 208. An authentication operation is performed using the card before the printing control apparatus 101 is operated, thereby identifying the user ID of the operator to determine which network is used by the operator based on the user management information. If the network used by the operator can be thus identified (YES in step S1303), then in step S1305, the CPU 207 identifies the network whose power supply control status is to be turned off. If the network used by the operator cannot be identified (NO in step S1303), for example, if an authentication operation is not performed using a guest ID or the card, then in step 1304, the CPU 207 causes the user to select the network whose the power supply control status is to be turned off. This processing is similar to that in step S1003 in FIG. 10. In step S1306, the CPU 207 changes the power supply control status of the corresponding network to "Off." Thus, if it is premised that the authentication operation is performed using the card, such processing eliminates the need for specifying a network at the time of the shutdown processing and automatically changing an appropriate power supply control status according to an operator, thus improving operability. An operator may also be identified by using a group ID for identifying an operator group instead of a user ID for identifying an operator as an individual.

Figure 16:
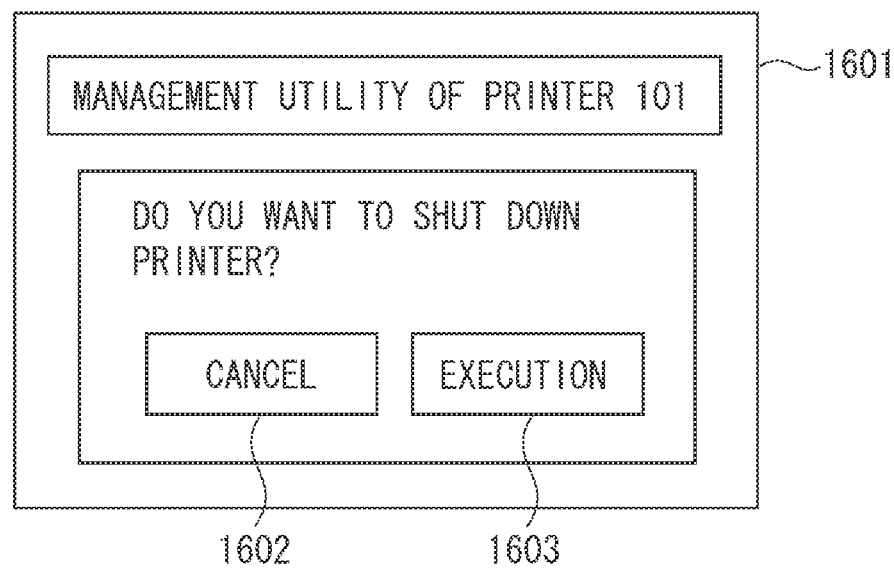
FIG. 16 illustrates an example of a shutdown instruction screen in a management utility of a terminal processing apparatus.

The terminal apparatus 111 or 115 is a personal computer (PC) using Windows® XP as its OS (Operating System) and installs a printer management utility bundled and distributed to the printing control apparatus 101. The printer management utility has a function to set and manage the printing control apparatus 101 and also a function to shut down the printing control apparatus 101 through the network by remote control. FIG. 16 illustrates an example of a screen displayed when the printer management utility shuts down the printing control apparatus 101. A dialog 1601 is displayed and an execution button 1603 is pressed to designate the shutdown processing. Pressing a cancel button 1602 cancels the shutdown operation.

Figure 15:
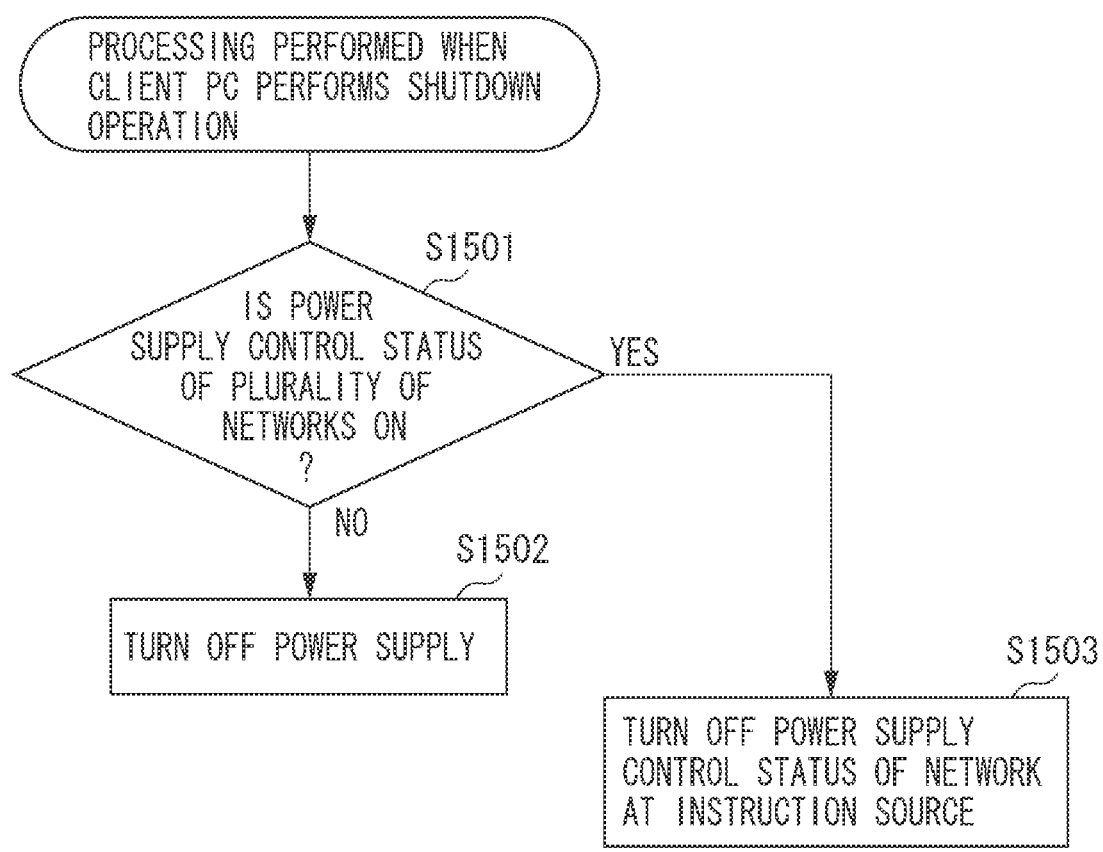
FIG. 15 is a flow chart illustrating a shutdown operation by a terminal apparatus according to an exemplary embodiment of the present invention.

FIG. 15 is a flow chart of the CPU 207 of the printing control apparatus 101 shut down by the terminal apparatus (client PC) 111 or 115. In step S1501, the CPU 207 refers to the power supply control status table in the second memory unit 208 to determine whether the power supply control status of a plurality of networks is turned on. If the power supply control status of a plurality of networks is not turned on (NO in step S1501), in other words, if the power supply control status of a single network is turned on, then in step S1502, the power supply is turned off. In this case, the CPU 207 saves various data stored in the second memory unit to the HDD unit 205 in advance to perform a series of processing operations for turning off the power supply of the printing control apparatus 101 and the image forming apparatus 107, and, thereafter, the CPU 207 turns off the power supply of the power supply unit 212. The CPU 207 displays a shutdown screen illustrated in FIG. 11 on the display unit 210 while performing a series of processing operations for turning off the power supply.

If the power supply control status of a plurality of networks is turned on (YES in step S1501), then in step S1503, the CPU 207 changes the power supply control status of the corresponding network to "Off." This processing is triggered by the shutdown operation of the terminal apparatus 111 or 115. The CPU 207 performs a network identification for determining from which NIC, the NIC 102 or the NIC 113, the instructions come. The CPU 207 then determines whether the power supply control status of the identified network is changed based on the network identification. Such processing allows appropriate processing to be performed without the operator clearly specifying which of networks in the shutdown operation from the terminal apparatus.

Figure 17:
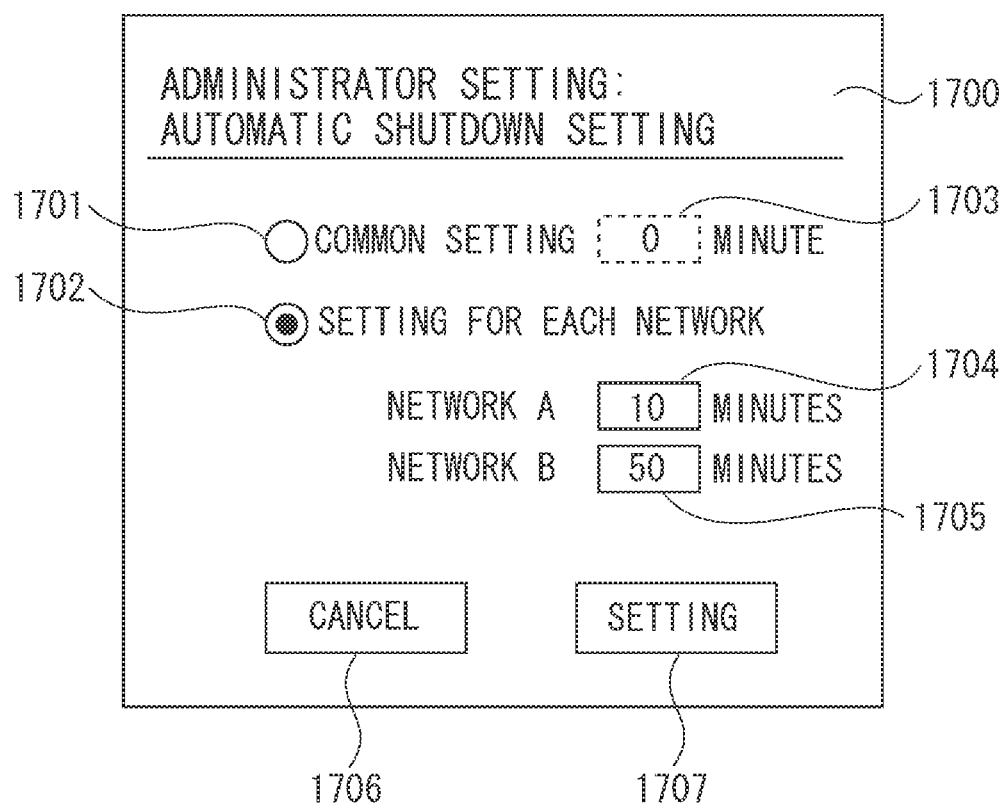
FIG. 17 illustrates an example of a screen for setting automatic shutdown displayed on the display unit of the printing control apparatus.

The printing control apparatus 101 has a function to automatically shut down the printing control apparatus 107 if the printing control apparatus 101 is not used for more than a predetermined time period. The present exemplary embodiment has a function capable of setting an automatic shutdown timer for each network. FIG. 17 illustrates an example of a screen for setting automatic shutdown by an administrator displayed on the display unit 210 of the printing control apparatus 101. Any one of radio buttons 1701 and 1702 can be selected. If the radio button 1701 is selected, a common automatic shutdown timer is used irrespective of networks. In that case, a timer setting box 1703 becomes effective and if the printing control apparatus 101 is not used for more than the time period set in the timer setting box 1703, the printing control apparatus 101 automatic shuts down. If the radio button 1701 is selected, time setting boxes 1704 and 1705 are grayed out.

On the other hand, if the radio button 1702 is selected, the automatic shutdown can be separately set for each network using the time setting boxes 1704 and 1705. In this case, the timer setting box 1703 is grayed out. The timer setting boxes 1703, 1704, and 1705 are numeral input boxes in units of minutes. In the present exemplary embodiment, setting can be performed in steps of one minute in the range of 0 to 180. The setting of "0" means that the automatic shutdown is not performed. The setting may be remotely changed according to the terminal apparatus 111 or 115 providing instructions for changing the setting of the automatic shutdown.

FIG. 18 illustrates an example of the power supply control status table according to the present exemplary embodiment. The power supply control status table is stored in the second memory unit 208 of the printing control apparatus 101. The power supply control status table is different from that in FIG. 9 in that the former stores setting values for the automatic shutdown timers for each network. More specifically, the time set by the timer setting boxes 1703, 1704, and 1705 in FIG. 17 is stored in the table. If the radio button 1701 is selected, time is set by the timer setting box 1703 as a common setting, the same value is stored in the automatic shutdown timer of each network of the power supply control status table in FIG. 18. The CPU 207 includes a timer function for measuring a continuous time period (referred to as continuous idle time) during which an operation is not performed by the operation unit 209 or a print job is not provided from the outside. The CPU 207 compares a continuous idle-time timer with the setting value of the automatic shutdown timer of the power supply control status table every minute. If the continuous idle time is longer than the setting value of the automatic shutdown timer, the corresponding power supply control status is changed to "Off." When the power supply control status of all the networks is turned off, the power supply unit 212 of the printing control apparatus 101 and the image forming apparatus 107 are turned off.

Figure 19:
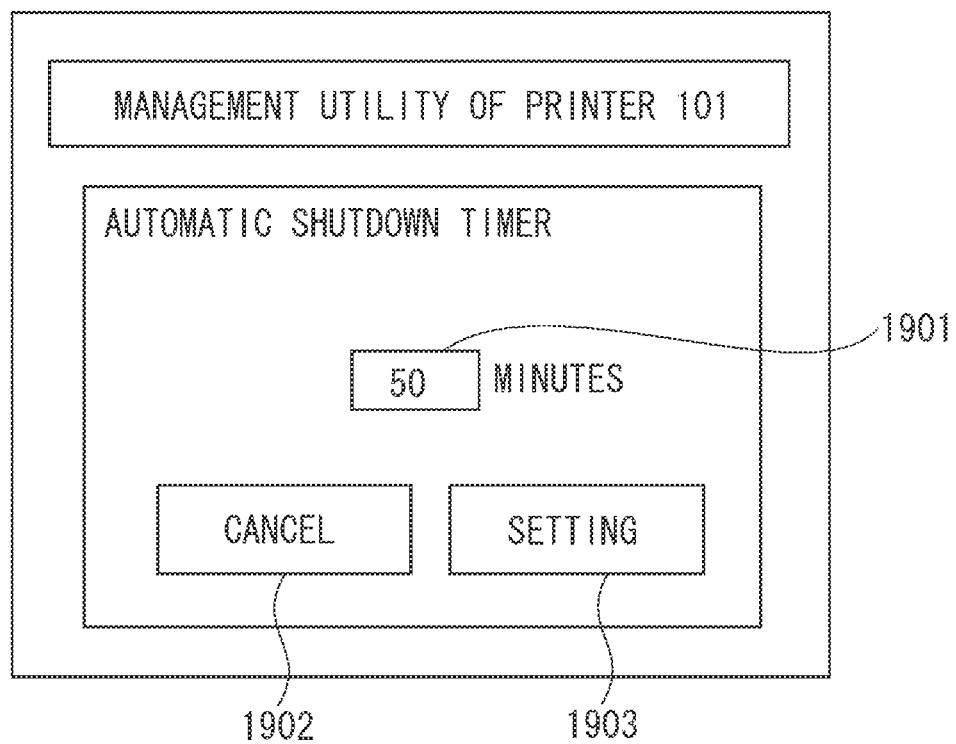
FIG. 19 illustrates an example of a screen for setting an automatic shutdown timer in the management utility of the terminal processing apparatus.

FIG. 19 illustrates an example of a screen for setting the automatic shutdown timer of the printer management utility installed in the terminal apparatus 111 or 115. Integers of from 0 to 180 can be input to a time input box 1901 and a setting button 1903 can be pressed, thereby allowing the automatic shutdown timer to be set. A cancel button 1902 can be pressed to enable canceling a setting operation. As is the case with FIG. 17, the setting of "0" means that the automatic shutdown is not performed. FIG. 19 is different from FIG. 17 in that setting is not performed for each network in FIG. 19. Since the management utility is operated by the PC on the network, the CPU 207 of the printing control apparatus 101 can identify a network through which the management utility is connected to perform the setting. The automatic shutdown of an appropriate network is set according to the identified network, thus enabling the operator to perform setting without confirming networks.

In the present exemplary embodiment, a configuration is described above in which the automatic shutdown timer can be set for each network. As another exemplary embodiment, the printing control apparatus 101 or the image forming apparatus 107 may have power saving modes with one or more steps and timer settings for shifting to power saving modes for each network.

Figure 20:
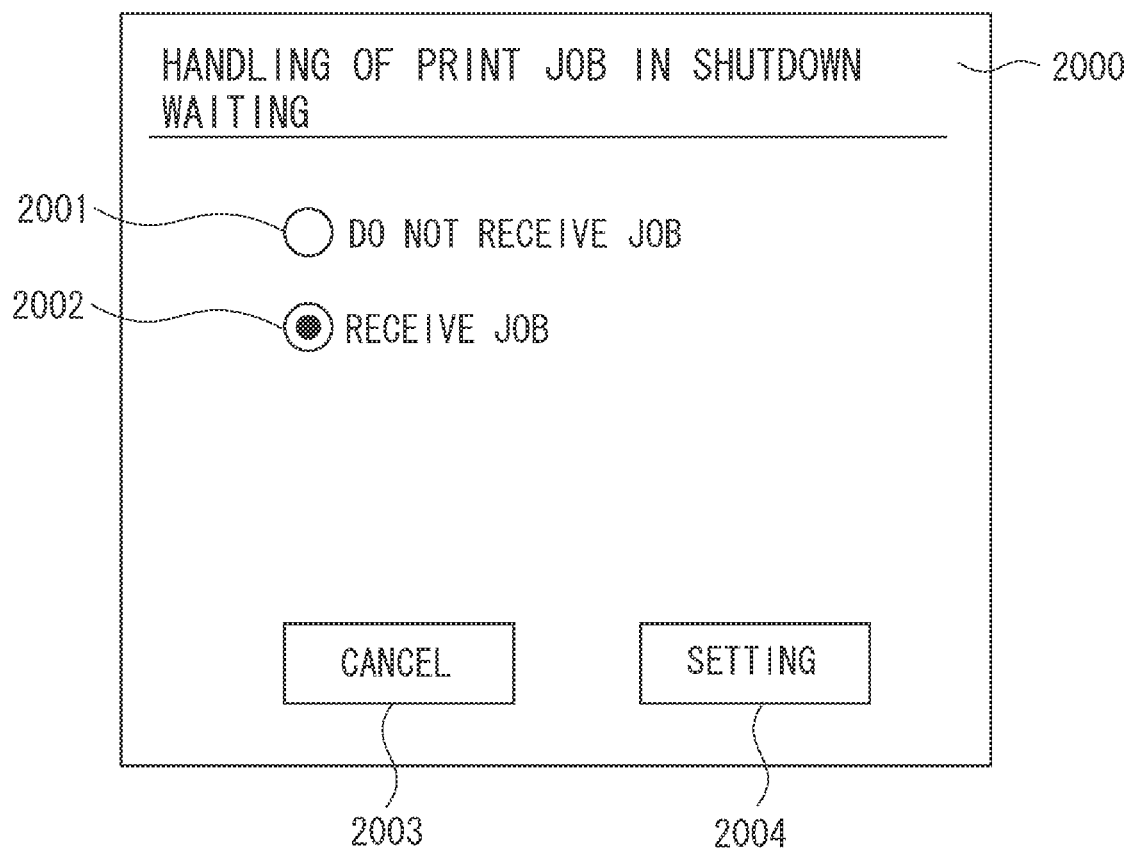
FIG. 20 illustrates an example of a screen for setting the handling of a print job in the waiting state for shutdown by the printing control apparatus.

As described above, in the present exemplary embodiment, the power supply is controlled with an on or off state stored in the power supply control status table for each network to allow the power supply control to be appropriately performed in a multi-home connection environment. For example, if the power supply control status on the network 112 is off, and the power supply control status on the network 116 is on, the network 112 is in a waiting state for shutdown. In this state, the present exemplary embodiment can switch setting as to whether a print job is received from the terminal apparatus 111. FIG. 20 illustrates an example of a screen for setting the handling of a print job in the waiting state for shutdown. The screen is displayed on the display unit 210 of the printing control apparatus 101 as one of setting screens for an administrator. If the radio button 2001 is selected, a print job is inhibited from being received from the network whose the power supply control status is turned off. On the other hand, if the radio button 2002 is selected, a print job is allowed to be received from the network whose the power supply control status is turned off. The administrator enables setting the reception of a job according to an operation method for networks.

Aspects of the present invention can also be realized by a computer of a system or apparatus (or devices such as a CPU, micro-processing unit (MPU), and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-161965 filed Jul. 8, 2009, which is hereby incorporated by reference herein in its entirety.

What is claimed is:

1. A printing control apparatus comprising:
   a connection unit configured to be connectable to a plurality of networks;
   a storage unit configured to store a power supply control status corresponding to each of the plurality of networks and indicating either an on or off state;
   a change unit configured to change the power supply control status for each network; and
   a control unit configured to control a power supply of an image forming apparatus based on the power supply control status of the plurality of networks.

2. The printing control apparatus according to claim 1, wherein the change unit changes the power supply control status according to setting of automatic shutdown for each network.

3. The printing control apparatus according to claim 1, wherein the change unit changes the power supply control status according to setting of a power saving mode for each network.

4. The printing control apparatus according to claim 1, further comprising an operation unit configured to issue an instruction for turning off the power supply of the image forming apparatus,
   wherein the control unit can change an operation for the instruction input via the operation unit according to the power supply control status.

5. The printing control apparatus according to claim 4, wherein the control unit allows a user to select a network whose power supply control status is to be changed to the off state based on an instruction being issued to turn off the power supply of the image forming apparatus when the power supply control status corresponding to the plurality of networks indicates the on state.

6. The printing control apparatus according to claim 4, wherein the control unit turns off the power supply of the image forming apparatus based on an instruction being issued to turn off the power supply of the image forming apparatus when the power supply control status for only one network indicates the on state.

7. The printing control apparatus according to claim 4, further comprising:
   an operator identification unit configured to identify an operator or an operator group operating the operation unit; and
   a network identification unit configured to identify a network being used based on the operator or the operator group,
   wherein the control unit controls the power supply of the image forming apparatus based on the operator or the operator group operating the operation unit and the power supply control status.

8. The printing control apparatus according to claim 1, further comprising a remote control unit configured to issue an instruction for turning off the power supply of the image forming apparatus via another apparatus connected to the network,
   wherein the control unit controls the power supply of the image forming apparatus based on the network being used by the remote control unit and the power supply control status if the remote control unit issues the instruction for turning off the power supply.

9. The printing control apparatus according to claim 2, further comprising a remote change unit configured to change setting of the image forming apparatus via another apparatus connected to the network,
   wherein the control unit changes setting of automatic shutdown corresponding to the network being used by the remote change unit if the remote change unit issues an instruction for changing the setting of automatic shutdown.

10. The printing control apparatus according to claim 1, further comprising a reception determination unit configured to determine whether to allow a print job to be received through a network whose power supply control status indicates the off state.

11. A method for controlling an image forming apparatus connectable to a plurality of networks, the method comprising:
    storing a power supply control status corresponding to each of the plurality of networks and indicating either an on or off state;
    changing the power supply control status for each network; and
    controlling a power supply of an image forming apparatus based on the power supply control status of the plurality of networks.

12. A non-transitory computer-readable storage medium storing a program for causing a computer to execute the method according to claim 11.

* * * * *